(No Model.)
I. STEAD.
DISINTEGRATING MACHINE FOR MAKING FIBER FOR MATS, HATS, &c.
No. 260,797. Patented July 11, 1882.
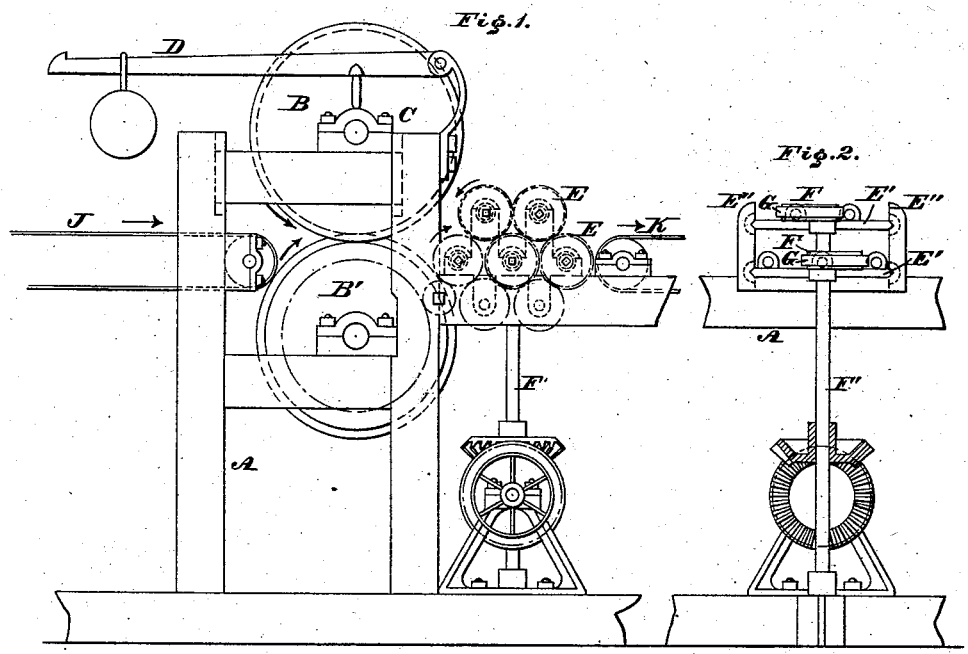
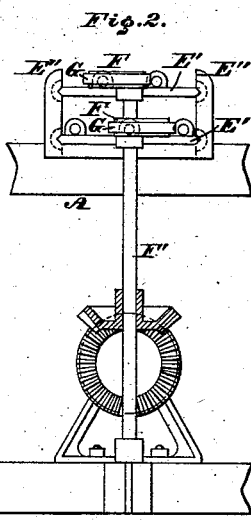
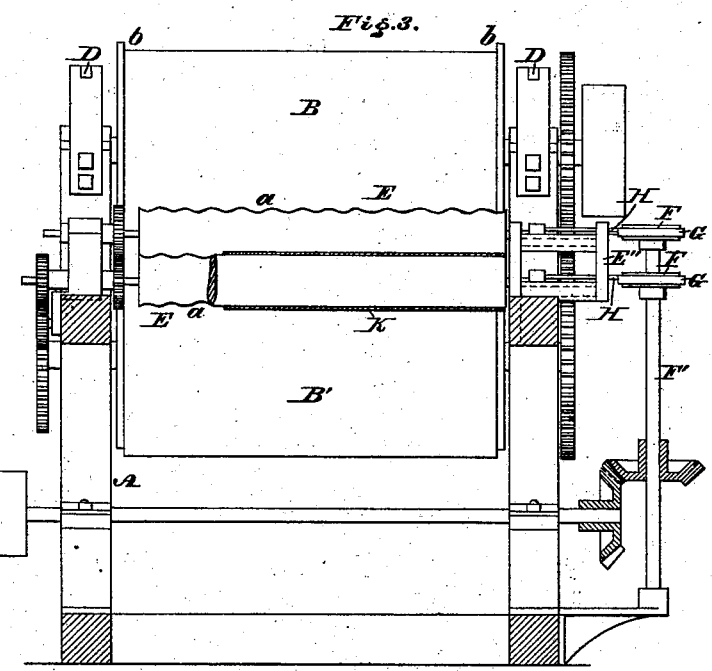
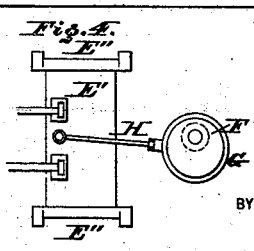
WITNESSES:
A. P. Grant,
H. F. Kircher
INVENTOR:
Isaac Stead,
BY John A. Wiedersheim
ATTORNEY.

UNITED STATES PATENT OFFICE.

ISAAC STEAD, OF PHILADELPHIA, PENNSYLVANIA.

DISINTEGRATING-MACHINE FOR MAKING FIBER FOR MATS, HATS, &c.

SPECIFICATION forming part of Letters Patent No. 260,797, dated July 11, 1882.

Application filed May 8, 1882. (No model.)

*To all whom it may concern:*

Be it known that I, ISAAC STEAD, a citizen of the United States, residing in the city and county of Philadelphia, State of Pennsylvania, have invented a new and useful Improvement in Disintegrating-Machines, which improvement is fully set forth in the following specification and accompanying drawings, in which—

Figure 1 is a side elevation of the fiber or disintegrating machine embodying my invention. Fig. 2 is a view of a portion of the opposite thereof. Fig. 3 is a vertical section thereof. Fig. 4 is a top view of a portion thereof.

Similar letters of reference indicate corresponding parts in the several figures.

My invention consists of a machine for disintegrating plants, leaves, &c., whereby there is obtained fiber suitable for the manufacture of mats, hats, and other articles, as will be hereinafter fully set forth.

Referring to the drawings, A represents the frame of the machine, and B B' represent crushing or squeezing rollers, which are mounted on horizontal axes on the frame A, the bearings C of the roller B being movable in a vertical direction, so that the rollers may separate. To the frame A are pivoted or hinged weighted arms D D, which rest on the bearings C and serve to depress said bearings, and consequently the upper roller, thus holding the latter firmly in operative position.

E represents two parallel sets of rollers, which are mounted horizontally on the frame A, and have their peripheries grooved or fluted, as at a, Fig. 3. These rollers have their bearings or boxes fixed to slides E', which are mounted on standards E'', and move in the transverse direction of the machine, and their other ends slide in the respective bearing, and said motion of the slides is effected by eccentrics F F, whose shaft F' is properly mounted on the frame and receives rotation from the driving-shaft of the machine, said eccentrics being encircled by yokes G, to which are connected arms H, the inner ends of which are pivoted to the slides E', it being seen that the eccentrics F are so disposed on their shaft F' that the sets of rollers E move in opposite directions or rub or work on each other. An apron, J, is employed in front of the rollers for feeding said rollers with the plants, leaves, &c., and an apron, K, is employed at the rear of the rollers E for conveying the fiber therefrom, said aprons being suitably operated.

The rollers B B' E are properly geared, so as to rotate in the direction of the arrows regardless of the rising and falling motions of the roller B and the transverse or rubbing motions of the rollers E, the rollers B B' rotating at less rate of speed than the rollers E.

The operation is as follows: When power is applied to the machine the aprons move and the several rollers and the eccentrics rotate. Fiber-containing plants, leaves, or other stock are placed on the apron J and advanced between the rollers B B', which crush said stock, and the crushed material is passed between the sets of rollers E E, where, restrained by the rollers B B', it is thoroughly rubbed and broken, thus removing the integument, covering, or woody substance of the stock and leaving the fiber intact. The substance removed may partially or entirely drop through the rollers E, while the fiber passes to the apron K, and is thus directed to a place of collection, after which it may be further manipulated or treated. The roller B has side flanges, b, which lap the roller B', thus preventing lateral escape of the stock.

The eccentrics F may be substituted by cranks without, however, producing different results from those stated.

It will be seen that I produce a simple, inexpensive, and compact machine for the purpose intended.

Having thus described my invention, what I claim as new, and desire to secure by Letters Patent, is—

1. The disintegrating-machine consisting of the crushing-rollers B B', the rubbing or breaking rollers E E, moving laterally in opposite directions, and the feed and discharge aprons J K, combined and operating substantially as and for the purpose set forth.

2. The crushing-rollers B B' and laterally-moving rollers E E, slides E', mounted on the frame-work, and connected to the bearings of the rollers E, eccentrics F, connected to said slides, and the feed and discharge aprons J K, substantially as and for the purpose set forth.

ISAAC STEAD.

Witnesses:
JOHN A. WIEDERSHEIM,
A. P. GRANT.